J. H. DOWNING.
NEEDLE ADJUSTING MEANS.
APPLICATION FILED OCT. 1, 1917.
1,273,589.
Patented July 23, 1918.
2 SHEETS—SHEET 2.
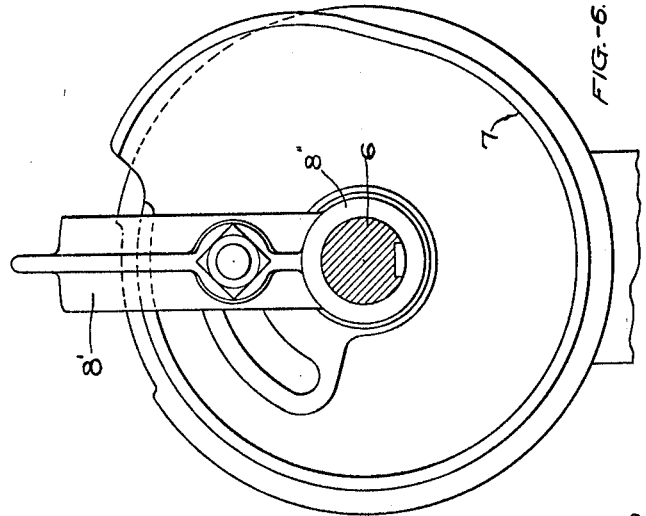
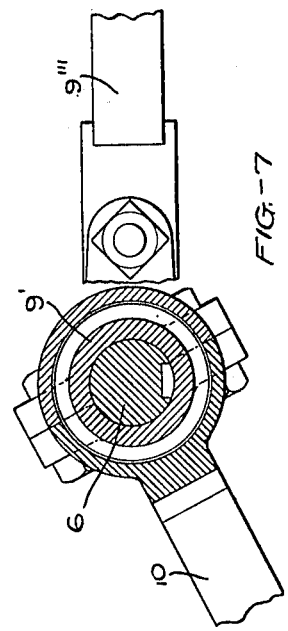
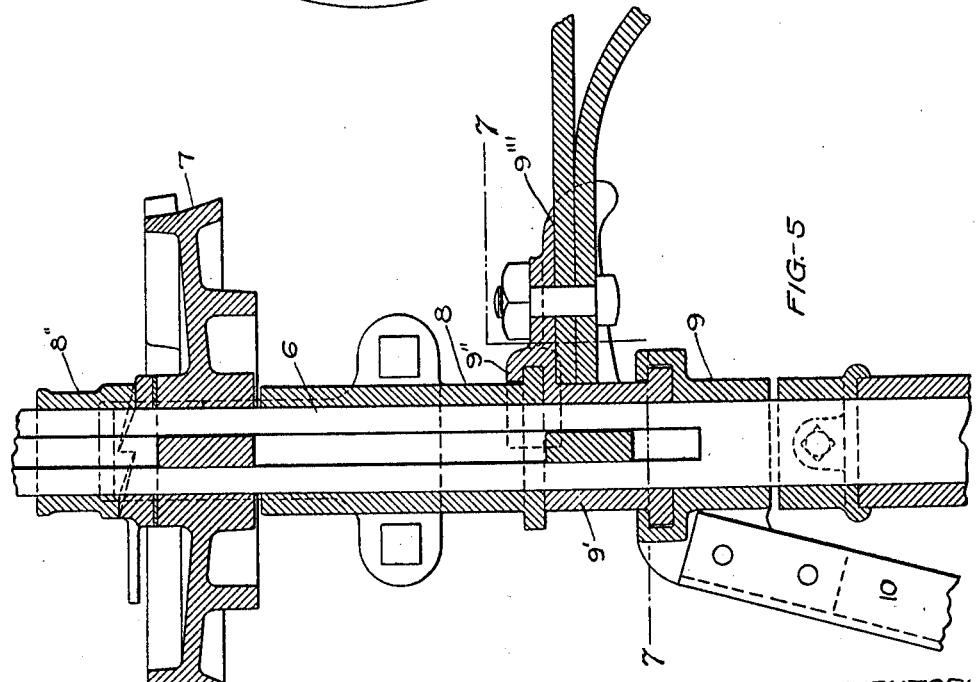
WITNESSES:
INVENTOR:
JOHN H. DOWNING.
BY
Paul & Paul
ATTORNEYS.

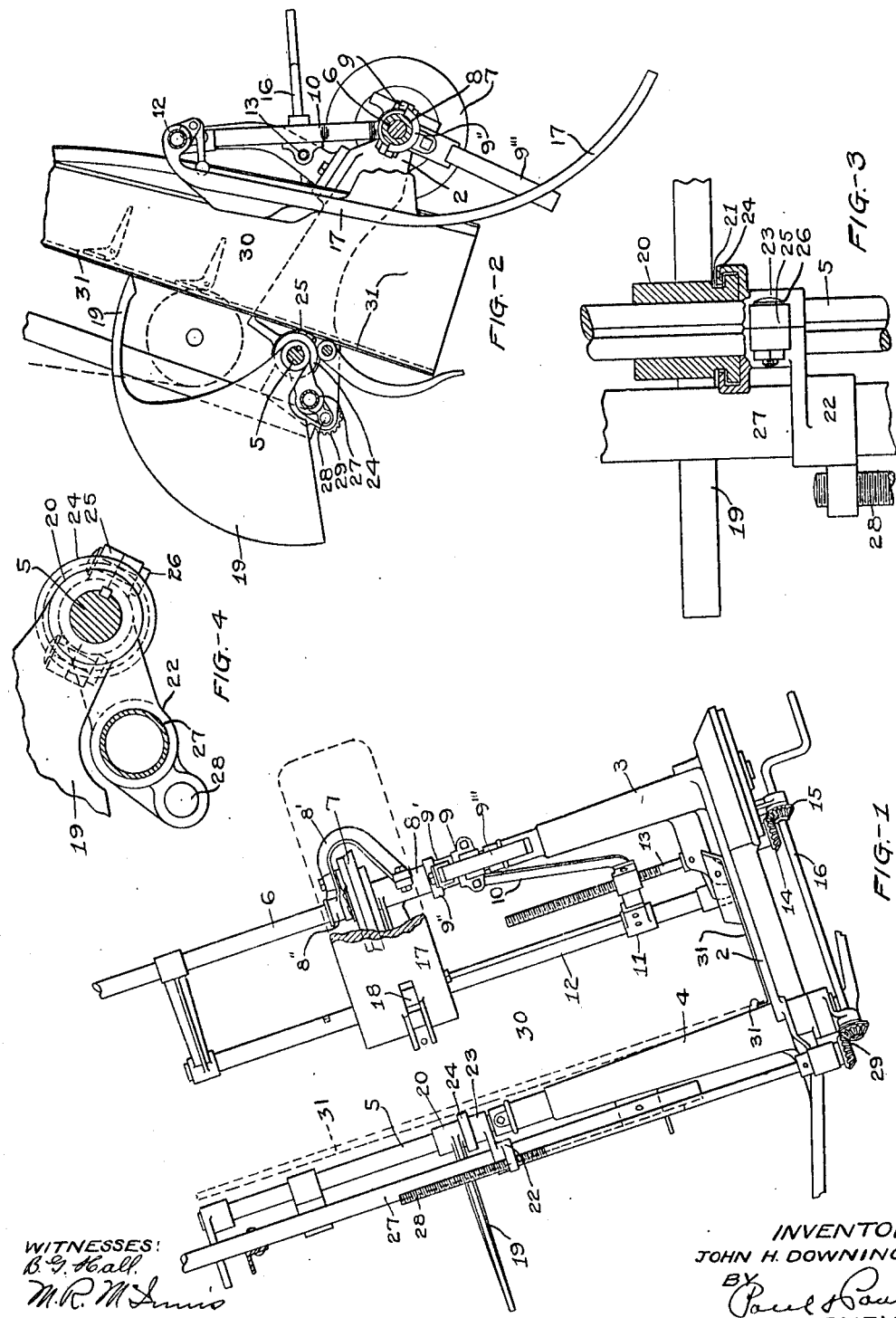

UNITED STATES PATENT OFFICE.

JOHN H. DOWNING, OF MINNEAPOLIS, MINNESOTA, ASSIGNOR TO THE STATE OF MINNESOTA.

NEEDLE-ADJUSTING MEANS.

1,273,589.   Specification of Letters Patent.   Patented July 23, 1918.

Application filed October 1, 1917. Serial No. 194,281.

*To all whom it may concern:*

Be it known that I, JOHN H. DOWNING, a subject of the King of England, residing at Minneapolis, county of Hennepin, State of Minnesota, have invented certain new and useful Improvements in Needle-Adjusting Means, of which the following is a specification.

The object of my invention is to provide a simple, inexpensive device by means of which the needle of a corn harvester can be raised or lowered to adapt it for different lengths of corn stalks.

A further object is to provide an adjusting means which will be positive in its action and strong and durable.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation, partially in section, of a portion of a corn harvester with my invention applied thereto, Fig. 2 is a horizontal sectional view of the same, Fig. 3 is a detail sectional view, showing the manner of mounting the needle and adjusting device on the needle shaft, Fig. 4 is a horizontal sectional view through the needle shaft and the guide for the adjusting mechanism, Fig. 5 is a vertical sectional view, showing the means for mounting and adjusting the knotter mechanism, Fig. 6 is a top view of the same, Fig. 7 is a sectional view on the line 7—7 of Fig. 5.

In the drawing, 2 represents a portion of a harvester having standards 3 and 4 thereon wherein the needle and knotter shafts 5 and 6 are mounted in any suitable way. 7 is a knotter mechanism which I do not illustrate in detail, as it forms no part of my present invention. It is mounted to slide on the shaft 6 and turn therewith. A sleeve 8 is loosely mounted on said shaft beneath the knotter and a yoke 8' has its lower end mounted on said sleeve and extends out around the knotter mechanism and has a hub 8'' slidable on the shaft 6 above the knotter. Vertical movement of the sleeve, therefore, will cause a corresponding movement of the knotter to adjust it for different elevations, according to the length of the cornstalks to be bound. A clamp 9 is loosely mounted on the shaft 6 and in which said shaft freely turns and engages a collar 9' that is keyed on said shaft and has a loop 9'' engaging the flanged lower end of the sleeve 8. When, therefore, the clamp 9 is raised or lowered, a corresponding movement will be imparted to the collar 9' and the sleeve 8, while said collar with the knotter device 7 is free to turn with the knotter shaft independently of the raising and lowering mechanism. The usual packer arms 9''' are mounted on the collar 9' for revolution therewith. A bracket 10 connects the clamp 9 with a collar 11 that is slidable on the upright guide rod 12.

An adjusting screw 13 has a threaded connection with the bracket 10 and is provided with a pinion 14 meshing with a similar pinion 15 on a crank 16, the revolution of said crank operating to revolve the screw 13 and raise and lower the bracket 10 and its connections. A breast plate 17 has a slotted opening 18 therein and opposite this opening on the shaft 5 is a needle 19 having a hub 20 that is slidable on the shaft 5 and mounted to revolve therewith. The needle operates through a slot 18 and it is essential, of course, when the breast plate is adjusted vertically that the needle be correspondingly moved, so that it will always have the same relative position with respect to the slot. The hub 20 is provided with an annular groove 21 and a carriage 22 is provided with a clamp 23 having a flange 24 to enter said groove, said clamp being formed in sections, as indicated in Fig. 3 and provided with lugs 25 secured together by bolts 26. When these bolts are loosened, the section of the clamp may be removed and allow the carriage to be detached entirely from the needle hub, but when the sections are clamped together, the carriage will be securely connected to the hub of the needle, while allowing the hub to receive the clamp with the movement of the needle. The carriage 22 is mounted to slide on a vertical guide 27 and evidently as the carriage is moved up and down the needle will have a corresponding movement. An adjusting screw 28 has a threaded engagement with the carriage 22 and is geared at 29 to the crank 16 in substantially the same manner as described with reference to the screw 13, so that when the crank is revolved a simultaneous movement will be imparted to the screws 13 and 28 and the needle and knotter mechanism will move vertically on their guides a corresponding distance. This simultaneous adjustment is old, but I claim a new and improved means for connecting the adjusting screw with the needle hub. This connection must be such that it will not bind on the upright guide and I have found it necessary to provide a carriage with a comparatively long bearing surface on the guide 27 to avoid any possibility of cramping or binding. The adjusting screw 28 is also located close to this guide and bearing surface, so that the power applied through the screw will be direct upon the bearing section of the carriage. The knotter mechanism, as indicated in Fig. 2, is located at one side of the throat or passage 30 through which the corn is fed, while the needle operates through the binder deck 31 on the other side of the path of the corn. This, however, is a common arrangement in machines of this type.

I have found that the foregoing described mechanism provides a positive and reliable means for raising and lowering the needle and knotter simultaneously, the parts being so constructed that they are substantial and durable and easily accessible for examination or repairs.

I claim as my invention:

1. In a corn harvester, a needle shaft, a needle and hub slidable thereon, said hub having a groove formed therein, a guide adjacent to said shaft and a carriage slidable on said guide, a clamp having a clutch for engaging said groove for positively moving said hub up and down on said shaft, and means for adjusting said carriage on said guide.

2. In a corn harvester, a needle shaft and needle, a hub therefor slidable on said shaft and having an annular groove therein, a guide adjacent said shaft, a carriage slidable on said guide and having an arm formed thereon, a clamp composed of separable sections mounted on said arm and having an annular flange to enter said groove, means for securing the sections of said clamp together, and means for adjusting said carriage on said guide.

3. In a corn harvester, a knotter shaft, a knotter mechanism slidable thereon, a sleeve mounted to slide on said shaft and wherein said shaft rotates, said sleeve being mounted to raise said knotter mechanism on said shaft, a yoke mounted at one end on said sleeve and extending up around said knotter mechanism and having a bearing on said shaft above said knotter mechanism for drawing it down when said sleeve is lowered, and means for operating said sleeve.

4. In a corn harvester, a knotter shaft, a knotter mechanism mounted to slide thereon, a yoke extending up around said knotter mechanism and having a sliding bearing on said shaft above and below said knotter mechanism and engaging the upper and lower portions thereof, the extension of said yoke to a point above said knotter mechanism providing an unobstructed space beneath said mechanism and means for raising or lowering said yoke to shift said mechanism.

5. In a corn harvester, a knotter shaft, a knotter mechanism mounted to slide vertically thereon, a sleeve wherein said shaft is mounted to revolve, said sleeve having a flanged lower end, a collar mounted to revolve with said shaft and having means for engaging said flange, and mechanism for raising and lowering said collar.

6. In a corn harvester, a knotter shaft, a knotter mechanism mounted to slide thereon and revolve therewith, a sleeve below said knotter mechanism in which said shaft revolves, a collar mounted to revolve with said shaft, packer arms carried by said collar, said collar having means for engaging said sleeve to raise or lower the same and permit independent revolution of said collar, and mechanism for raising or lowering said collar.

7. In a corn harvester, a knotter shaft, a knotter mechanism mounted to slide thereon and revolve therewith, a sleeve slidable on said shaft for raising said knotter mechanism and in which sleeve said shaft revolves independently thereof, a collar mounted to revolve with said shaft and having means for engaging said sleeve to raise or lower the same, a clamp loosely mounted on said shaft and engaging said collar for adjustment thereof, a bracket connected to said clamp, an upright guide whereon said bracket is slidable, and an adjusting screw engaging said bracket.

8. In a corn harvester, a needle shaft, a needle and hub slidable thereon, a guide adjacent to said shaft, a carriage having a comparatively long bearing surface on said guide, means connected with said carriage and having an annular groove and lip connection with said needle hub for movement therewith on said shaft, and means for adjusting said carriage on said guide to shift the position of said needle hub on said shaft.

In witness whereof, I have hereunto set my hand this 18th day of September, 1917.

JOHN H. DOWNING.

Witnesses:
R. B. McPhetres,
W. G. Nelson.